(12) United States Patent
Yokohata et al.

(10) Patent No.: US 8,363,895 B2
(45) Date of Patent: Jan. 29, 2013

(54) IMAGE PROCESSING APPARATUS AND IMAGE SENSING APPARATUS

(75) Inventors: Masahiro Yokohata, Osaka (JP); Seiji Okada, Hirakata (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 334 days.

(21) Appl. No.: 12/731,209

(22) Filed: Mar. 25, 2010

(65) Prior Publication Data

US 2010/0260379 A1    Oct. 14, 2010

(30) Foreign Application Priority Data

Apr. 8, 2009    (JP) .................................. 2009-093976

(51) Int. Cl.
*G06K 9/00*    (2006.01)
*H04N 1/00*    (2006.01)
(52) U.S. Cl. .................. 382/103; 358/434; 358/435
(58) Field of Classification Search .................. 382/103, 382/107, 236, 106; 348/169, 170, 171, 172, 348/208.1, 208.2, 28.14, 208.16; 358/3.23, 358/426.12, 434, 435, 436, 438, 439, 448
See application file for complete search history.

(56) References Cited

U.S. PATENT DOCUMENTS

| 7,177,243 | B2 * | 2/2007 | Lee et al. | ................... | 369/44.32 |
| 7,423,669 | B2 * | 9/2008 | Oya et al. | ................. | 348/208.14 |

FOREIGN PATENT DOCUMENTS

| JP | 04282989 | 10/1992 |
| JP | 09322178 | 12/1997 |
| JP | 2005-309746 A | 11/2005 |
| JP | 2010-028608 A | 2/2010 |

OTHER PUBLICATIONS

Yoav Freund and Robert E. Schapire, "A Decision-Theoretic Generalization of On-Line Learning and an Application to Boosting," AT&T Bell Laboratories; Published Sep. 20, 1995.
Japanese Office Action issued Sep. 18, 2012 in corresponding Japanese application No. 2009-093976.
Partial Translation and English Abstract for JP 2005-309746 A, published Nov. 4, 2005.
English Abstract for JP 2010-028608 A, published Feb. 4, 2010.

* cited by examiner

*Primary Examiner* — Abolfazl Tabatabai
(74) *Attorney, Agent, or Firm* — NDQ&M Watchstone LLP (57) ABSTRACT

A tracking process portion includes a search area setting portion for setting a search area in the input image, an image analysis portion for analyzing an image in the search area, an auxiliary track value setting portion for setting an auxiliary track value based on a result of the analysis, a track value setting portion for setting an auxiliary track value based on a result of the analysis and deciding whether the set track value is correct or not, and a track target detection portion for detecting a track object from the image in the search area based on the track value. If the set track value is incorrect, the track value setting portion performs a switching operation for setting the auxiliary track value and a track value.

8 Claims, 10 Drawing Sheets

IMAGE PROCESSING APPARATUS AND IMAGE SENSING APPARATUS

CROSS-REFERENCE TO RELATED APPLICATIONS

This application claims priority to Japanese Patent Application No. 2009-093976 filed on Apr. 8, 2009, which is hereby incorporated by reference in its entirety.

BACKGROUND OF THE INVENTION

1. Field of the Invention

The present invention relates to an image processing apparatus for processing an input image and an image sensing apparatus including the image processing apparatus.

2. Description of Related Art

Recent years, a digital image sensing apparatus for sensing and recording images, and a digital reproduction apparatus for reproducing images are widely available. Among these electronic apparatuses, there is an apparatus that performs tracking process in which a predetermined subject (hereinafter referred to as a track object) is detected from input images supplied sequentially. A result of the detection can be used for processing images that are taken and recorded or images that are reproduced, or for controlling various parameters such as a focal point, exposure and the like in image sensing.

However, it is difficult to detect the track object continuously among input images changing from moment to moment while maintaining high accuracy.

Therefore, there is proposed a method of recognizing a plurality of colors of the track object together with a positional relationship or the like of each color part, so as to detect the track object based on a result of the integral recognition thereof. If the track object is detected by this method, the track object can be detected accurately.

However, the above-mentioned detection method of the track object requires to process much information at one time. Therefore, there is a problem that the process becomes complicated so that the process time and power consumption are increased. In addition, there is also a problem that the detection becomes difficult if the part for detecting the track object is blocked by an obstacle.

SUMMARY OF THE INVENTION

An image processing apparatus of the present invention includes:

a track value setting portion which sets a track value which is a signal value indicating a track object in an input image;

an auxiliary track value setting portion which sets an auxiliary track value which is a signal value indicating the track object and is different from the track value; and a track target detection portion which detects a pixel having the track value from the input image, wherein the track value setting portion is capable of performing a switching operation in which the auxiliary track value is set as a new track value instead of the set track value.

An image sensing apparatus according to the present invention includes:

an image sensing portion which generates an input image by image sensing;

the above-mentioned image processing apparatus, wherein the image sensing apparatus performs control based on a result of the detection of the track object by the image processing apparatus.

DETAILED DESCRIPTION OF THE PREFERRED EMBODIMENTS

Meanings and effects of the present invention will be further clarified from the following description of embodiment. However, the following embodiment is merely one of embodiments of the present invention, and meanings of the present invention and individual elements are not limited to those described in the following embodiment.

An embodiment of the present invention will be described with reference to the attached drawings. First, an example of an image sensing apparatus according to the present invention will be described. Note that the image sensing apparatus described below is capable of recording sound, moving images, and still images, like a digital camera.

<<Image Sensing Apparatus>>

Figure 1:
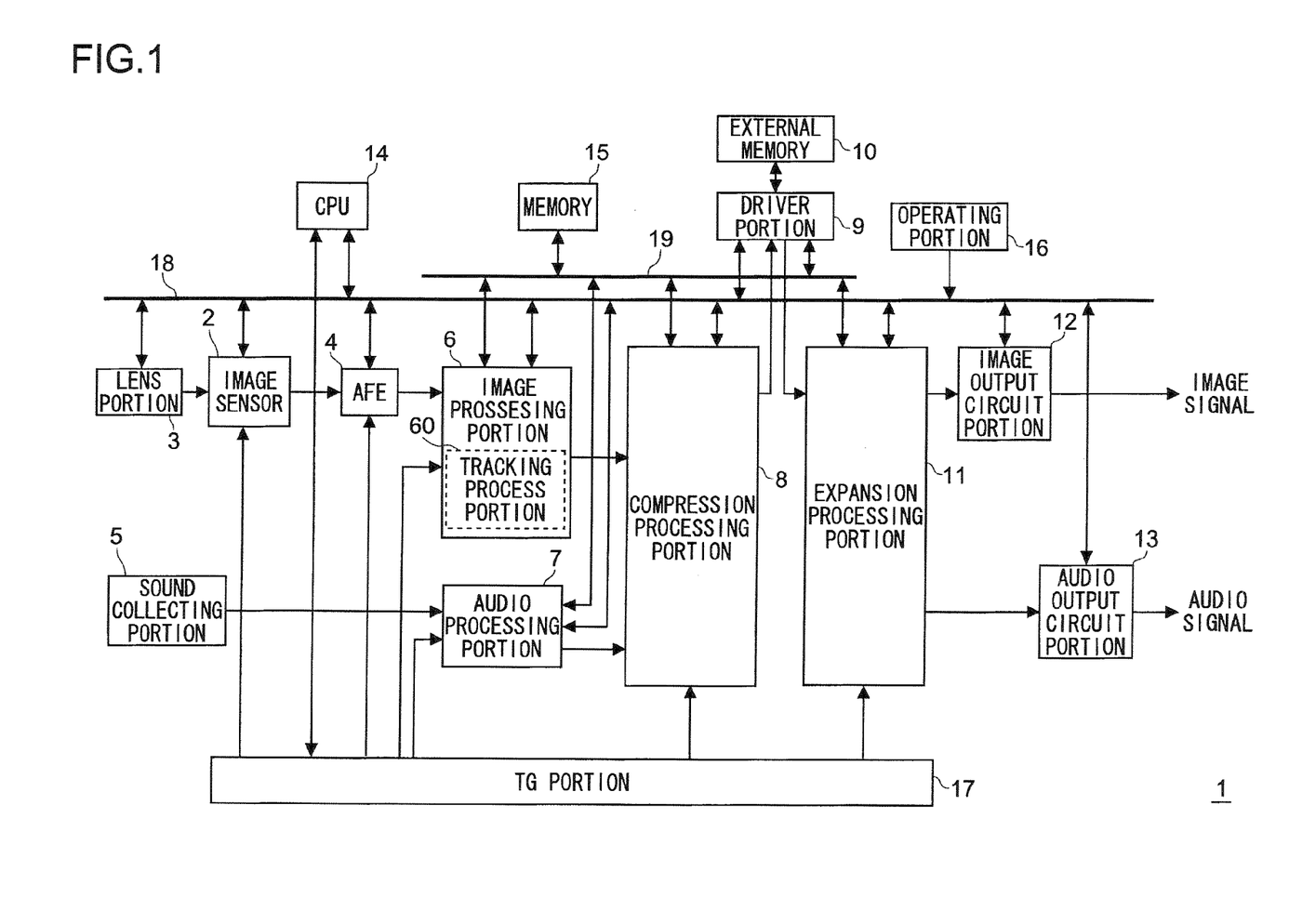
FIG. 1 is a block diagram illustrating a structure of an image sensing apparatus according to an embodiment of the present invention.

First, a structure of the image sensing apparatus will be described with reference to FIG. 1. FIG. 1 is a block diagram illustrating a structure of the image sensing apparatus according to an embodiment of the present invention.

As illustrated in FIG. 1, the image sensing apparatus 1 includes an image sensor 2 constituted of a solid-state image sensor such as a charge coupled device (CCD) or a complementary metal oxide semiconductor (CMOS) sensor for converting an input optical image into an electric signal, and a lens portion 3 for forming an optical image of a subject in the image sensor 2 and adjusting light quantity and the like. The lens portion 3 and the image sensor 2 constitute the image sensing portion, and an image signal is generated by the image sensing portion. Note that the lens portion 3 includes various lenses (not shown) such as a zoom lens and a focus lens, and an iris stop (not shown) for adjusting quantity of light entering the image sensor 2.

Further, the image sensing apparatus 1 includes an analog front end (AFE) 4 for converting the image signal that is an analog signal output from the image sensor 2 into a digital signal and adjusting a gain, a sound collecting portion 5 for converting input sound into an electric signal, an image processing portion 6 for converting image signal constituted of red (R), green (G) and blue (B) digital signals output from the AFE 4 into a signal constituted of a luminance signal (Y) and color difference signals (U and V) and for performing various image processings on the image signal, an audio processing portion 7 for converting an audio signal that is an analog signal output from the sound collecting portion 5 into a digital signal, a compression processing portion 8 for performing a compression coding process for still images such as the JPEG (Joint Photographic Experts Group) compression method on the image signal output from the image processing portion 6 and performing a compression coding process for moving images such as the MPEG (Moving Picture Experts Group) compression method on the image signal output from the image processing portion 6 and on the audio signal from the audio processing portion 7, an external memory 10 for recording compression coded signal after the compression coding process by the compression processing portion 8, a driver portion 9 for recording and reading the image signal in and from the external memory 10, and an expansion processing portion 11 for expanding and decoding the compression coded signal read from the external memory 10 by the driver portion 9. In addition, the image processing portion 6 includes a tracking process portion 60 for performing a tracking process of detecting a track object from an input image signal. Note that a detail of a structure of the tracking process portion 60 will be described later.

In addition, the image sensing apparatus 1 includes an image output circuit portion 12 for converting the image signal decoded by the expansion processing portion 11 into a signal in a faun that can be displayed on a display apparatus (not shown) such as a display, and an audio output circuit portion 13 for converting the audio signal decoded by the expansion processing portion 11 into a signal in a form that can be reproduced by a reproduction apparatus (not shown) such as a speaker.

In addition, the image sensing apparatus 1 includes a central processing unit (CPU) 14 for controlling operations of the entire image sensing apparatus 1, a memory 15 for storing programs for performing the processes and temporarily storing signals when the programs are executed, an operating portion 16 for entering instructions from a user, such as a button for starting to take images or a button for deciding various setting, a timing generator (TG) portion 17 for delivering a timing control signal for synchronizing operation timings of the individual portions, a bus line 18 for communicating signals between the CPU 14 and the individual portions, and a bus line 19 for communicating signals between the memory 15 and the individual portions.

Note that any type of external memory 10 can be used as long as it can record the image signal and the audio signal. For instance, a semiconductor memory such as a secure digital (SD) card, an optical disc such as a DVD, and a magnetic disk such as a hard disk can be used as the external memory 10. In addition, the external memory 10 may be detachable from the image sensing apparatus 1.

Next, a fundamental action of the image sensing apparatus 1 will be described with reference to FIG. 1. First, the image sensing apparatus 1 performs photoelectric conversion of incident light from the lens portion 3 in the image sensor 2 so as to obtain the image signal that is an electric signal. Then, the image sensor 2 outputs the image signal to the AFE 4 sequentially at a predetermined frame period (e.g., 1/30 seconds) in synchronization with the timing control signal supplied from the TG portion 17. Then, the image signal that is a digital signal converted from an analog signal by the AFE 4 is supplied to the image processing portion 6. The image processing portion 6 converts the image signal into a signal using YUV and performs various image processings such as gradation correction and edge enhancement. In addition, the memory 15 works as a frame memory so as to hold the image signal temporarily when the image processing portion 6 performs processes.

In addition, on this occasion, based on the image signal supplied to the image processing portion 6, the lens portion 3 adjusts positions of various lenses so that focus adjustment is performed, and adjusts an opening degree of the iris stop so that exposure adjustment is performed. The various adjustments such as focus adjustment and exposure adjustment are performed automatically based on a predetermined program to be optical states or are performed manually based on an instruction from a user. In addition, the tracking process portion 60 performs the tracking process on the image signal supplied to the image processing portion 6. Note that a detail of operations of the tracking process portion 60 will be described later.

When recording a moving image, not only an image signal but also an audio signal is recorded. The audio signal converted into an electric signal and is output by the sound collecting portion 5 is supplied to the audio processing portion 7 and is digitized, and processes such as noise reduction are performed on it. Then, the image signal output from the image processing portion 6 and the audio signal output from the audio processing portion 7 are both supplied to the compression processing portion 8, and the image signal is compressed by a predetermined compression method in the compression processing portion 8. In this case, the image signal and the audio signal are temporally associated with each other, so that the image and the sound are not deviated from each other when they are reproduced. Then, the compressed image signal and audio signal are recorded in the external memory 10 via the driver portion 9.

On the other hand, when recording a still image or only sound, the image signal or the audio signal is compressed by a predetermined compression method in the compression processing portion 8 and is recorded in the external memory 10. Note that it is possible that the image processing portion 6 performs different processes for recording a moving image and for recording a still image.

The compressed image signal and audio signal recorded in the external memory 10 is read out to the expansion processing portion 11 based on an instruction from a user. The expansion processing portion 11 expands the compressed image signal and audio signal so as to deliver the image signal and the audio signal to the image output circuit portion 12 and the audio output circuit portion 13, respectively. Then, the image output circuit portion 12 and the audio output circuit portion 13 convert the signals into signals of forms that can be displayed and reproduced by the display device and the speaker so as to output the signals.

Note that the display device and the speaker may be integral with the image sensing apparatus 1 or may be separate from the same so that they are connected by using terminals provided to the image sensing apparatus 1 and a cable or the like.

In addition, in a so-called preview mode in which a user can check the image displayed on the display device without recording the image signal, it is possible to output the image signal from the image processing portion 6 without compressing to the image output circuit portion 12. In addition, it is possible that the tracking process portion 60 performs the tracking process in the preview mode regardless of whether the image to be recorded is a moving image or a still image.

In addition, when recording a image signal of a moving image, in parallel to compressing by the compression processing portion 8 and recording in the external memory 10, it is possible to output the image signal to the display device or the like via the image output circuit portion 12.

<<Tracking Process Portion>>

Figure 2:
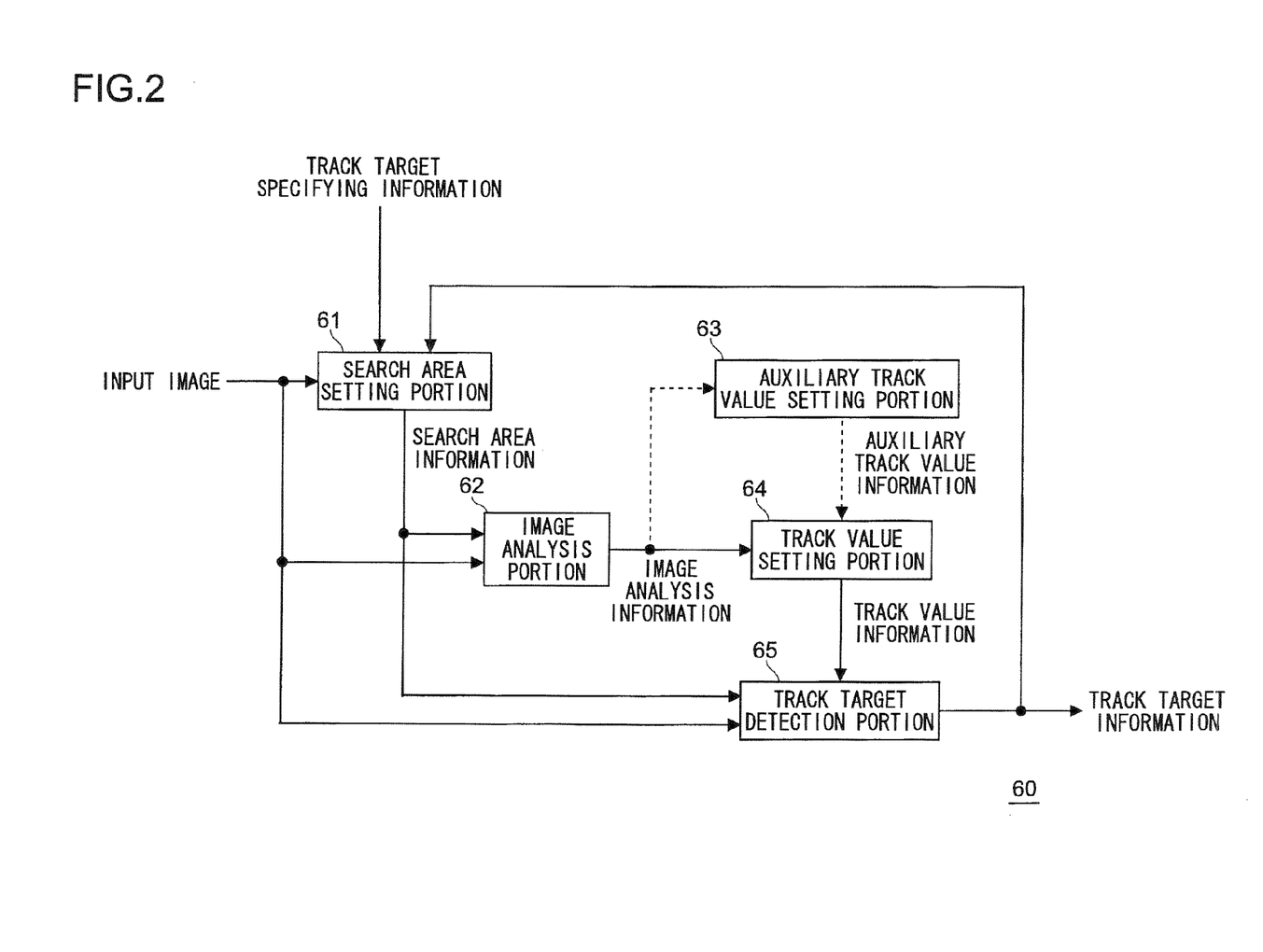
FIG. 2 is a block diagram illustrating a structure of a tracking process portion of the image sensing apparatus according to an embodiment of the present invention.

Next, a structure of the tracking process portion 60 illustrated in FIG. 1 will be described with reference to the drawings. FIG. 2 is a block diagram illustrating a structure of the tracking process portion of the image sensing apparatus according to an embodiment of the present invention. Note that for a concrete description, the image signal that is supplied to the tracking process portion 60 for performing the tracking process is expressed as the image and is referred to as the "input image" in the following description. In addition, the subject to be tracked is referred to as a track object, and a part of the track object, which is a characteristic part to be detected by the tracking process portion 60, is referred to as a track target.

The tracking process portion 60 includes a search area setting portion 61 for setting a search area in the input image so as to generate and output search area information, an image analysis portion 62 for analyzing images in the search area indicated by the search area information of the input image so as to generate and output image analysis information, an auxiliary track value setting portion 63 for setting an auxiliary track value based on the image analysis information if necessary so as to generate and output auxiliary track value information, a track value setting portion 64 for setting a track value based on the auxiliary track value information and the image analysis information so as to generate and output track value information, and a track target detection portion 65 for detecting a track target by detecting a part to be the track value indicated by the track value information from images in the search area indicated by the search area information of the input image so as to generate and output track target information.

Track target specifying information supplied externally and track target information delivered from the track target detection portion 65 are supplied to the search area setting portion 61 and are used for setting the search area. In addition, the track value setting portion 64 stores the track value that is set based on the image analysis information and the auxiliary track value indicated by the auxiliary track value information in itself or in the memory 15 or the like so as to switch the track value in accordance with the image analysis information.

In addition, the track target information output from the track target detection portion 65 indicates a position of the track target in the input image (i.e., position of the track object). The image sensing apparatus 1 performs various processes based on the track target information. For instance, setting control of the image sensing portion such as focus and exposure, image processing of the input image, and the like are performed.

Figure 3:
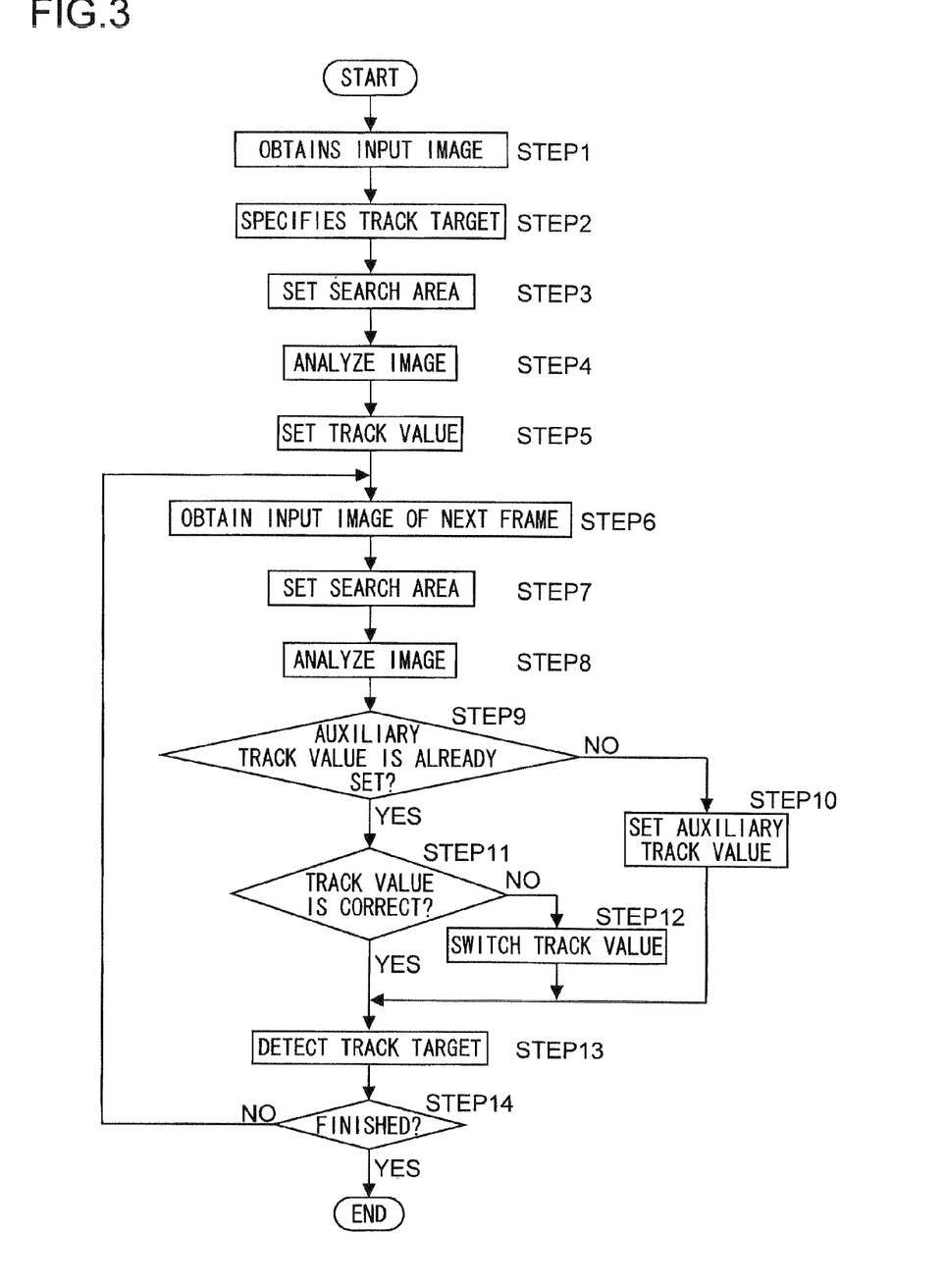
FIG. 3 is a flowchart illustrating an operation of the tracking process portion of the image sensing apparatus according to an embodiment of the present invention

In addition, an operation of the tracking process portion 60 will be described with reference to the drawings. FIG. 3 is a flowchart illustrating an operation of the tracking process portion of the image sensing apparatus according to an embodiment of the present invention.

As illustrated in FIG. 3, the tracking process portion 60 first obtains the input image (STEP 1) and specifies the track target (STEP 2). Note that obtaining of the input image in STEP 1 may be repeated until the track target is specified in STEP 2 so that the track target is specified from the latest input image.

Specifying of the track target in STEP 2 may be performed, for example, by a user who checks the input image displayed on the display device of the image sensing apparatus 1 and specifies one directly, or by a program or the like automatically. In addition, it may be performed by a user who selects one from a plurality of track target candidates specified by a program or the like.

When a user specifies the track target, the user may operates the operating portion 16 constituted of a cursor key, a touch panel, or the like to as to specify the track target, for example. In addition, if the track target or the candidate thereof is specified by a program, it is possible, for example, to perform a face detection process for detecting a nonspecific face in the input image or a face recognition process for detecting a specific face, so as to specify a part of the track object having the detected face (e.g., a body region that is a region existing in the direction from the middle of the forehead toward the mouth of the detected face) as the track target or the candidate thereof. As a method for the face detection or the face recognition, it is possible to use various well-known techniques. For instance, it is possible to utilize Adaboost (Yoav Freund, Robert E. Schapire, "A decision-theoretic generalization of on-line learning and an application to boosting", European Conference on Computational Learning Theory, Sep. 20, 1995) for comparing a weight table generated from a large volume of teaching samples (face and non-face sample images) with the input image so as to perform the face detection or the face recognition.

The information of the track target specified by the above-mentioned method is supplied as the track target specifying information to the search area setting portion 61. The search area setting portion 61 sets the search area round the track target specified by the track target specifying information (STEP 3). For instance, a region of a predetermined area round the track target is set as the search area. Note that the track target specifying information may include a position of the track target (e.g., a barycenter position) and a size of the track target. Further, the search area may be a region having a size corresponding to a size of the track target (e.g., a size in which the track target can be sufficiently included) round the barycenter position of the track target. In addition, the search area may have any shape. For instance, it has a rectangular shape as described later, or a circular shape or an elliptic shape.

Figure 4A:
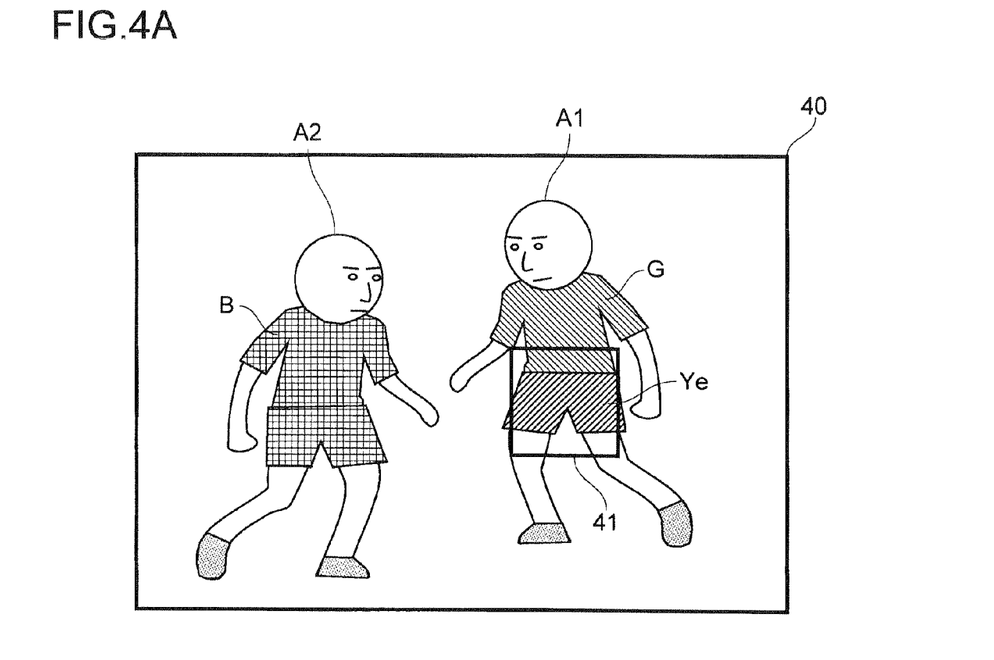
FIG. 4A is a diagram illustrating an example of an input image.
Figure 4B:
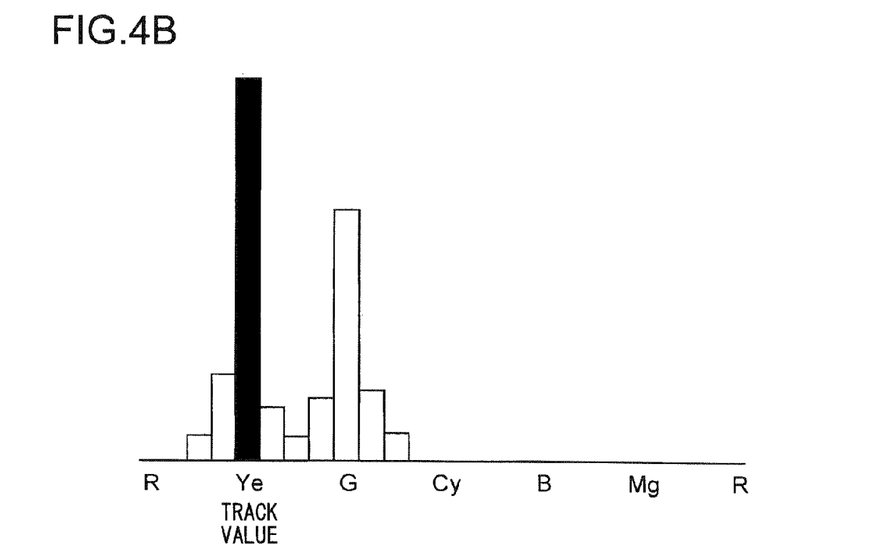
FIG. 4B is a diagram illustrating a result of image analysis of the input image illustrated in FIG. 4A.

The search area set in STEP 3 is output as the search area information from the search area setting portion 61. Then, the image analysis portion 62 analyzes the image in the search area indicated by the search area information (STEP 4). For instance, a histogram of signal values of pixels included in the search area (values of the same type as the track value) is generated for the analysis. An example of a result of the image analysis using the histogram (frequency distribution) will be described with reference to FIGS. 4A and 4B. FIG. 4A is a diagram illustrating an example of the input image, and FIG. 4B is a diagram illustrating a result of image analysis of the input image illustrated in FIG. 4A. In particular, FIG. 4A is a diagram illustrating an example of the input image in which the search area is set, and FIG. 4B is a diagram illustrating a histogram of signal values obtained from the image in the search area illustrated in FIG. 4A.

The track value and the signal value may be any type of value (e.g., individual values of RGB, a luminance value, or a value of H of the signal expressed by H (hue), S (chroma saturation) and V (brightness)). Hereinafter, for a specific description, an example of the case where a hue value (hereinafter referred to as color simply) is used will be described. In addition, in the following description, the hue value is expressed by using not a value of angle or the like but a simple color type (e.g., yellow, green, blue and the like) in a simplified manner.

In an input image 40 illustrated in FIG. 4A, a part of pants and its periphery of a person A1 as a track object is specified as a track target, so that a rectangular search area 41 is set in the part. In addition, the color of the pants of the person A1 is yellow Ye, and the color of a shirt is green G. Further, the input image 40 also includes a person A2, and colors of pants and a shirt of the person A2 are both blue B. In this case, the histogram of colors of individual pixels in the search area 41 becomes as illustrated in FIG. 4B. Specifically, the obtained histogram indicates that the number of pixels of yellow Ye is largest and the number of pixels of green G is the next. The image analysis portion 62 generated such histogram information and outputs it as image analysis information.

The track value setting portion 64 sets the track value based on the histogram indicated by the image analysis information (STEP 5). The track value setting portion 64 sets, for example, the color having a highest frequency in the histogram (yellow Ye in FIG. 4B) as the track value. Note that it is possible to set the color specified by a user as the track value. In addition, the set track value is held in the track value setting portion 64 or in the memory 15.

When the track value is set in STEP 5, the input image of the next frame is obtained (STEP 6). Then, the search area setting portion 61 sets the search area in the obtained input image similarly to STEP 3 (STEP 7). For instance, the search area is set based on a position or a size of the track target specified or detected in the just previous input image. Then, the image analysis portion 62 analyzes the image in the search area of the input image similarly to STEP 4, so as to output the image analysis information (STEP 8).

Here, if the auxiliary track value is not set (NO in STEP 9), the auxiliary track value setting portion 63 sets the auxiliary track value based on the image analysis information (STEP 10). Then, the track value setting portion 64 outputs the currently set track value (e.g., yellow Ye) as the track value information to the track target detection portion 65. The track target detection portion 65 detects the pixel having the track value in the search area of the input image so as to detect the track target (STEP 13).

Figure 5:
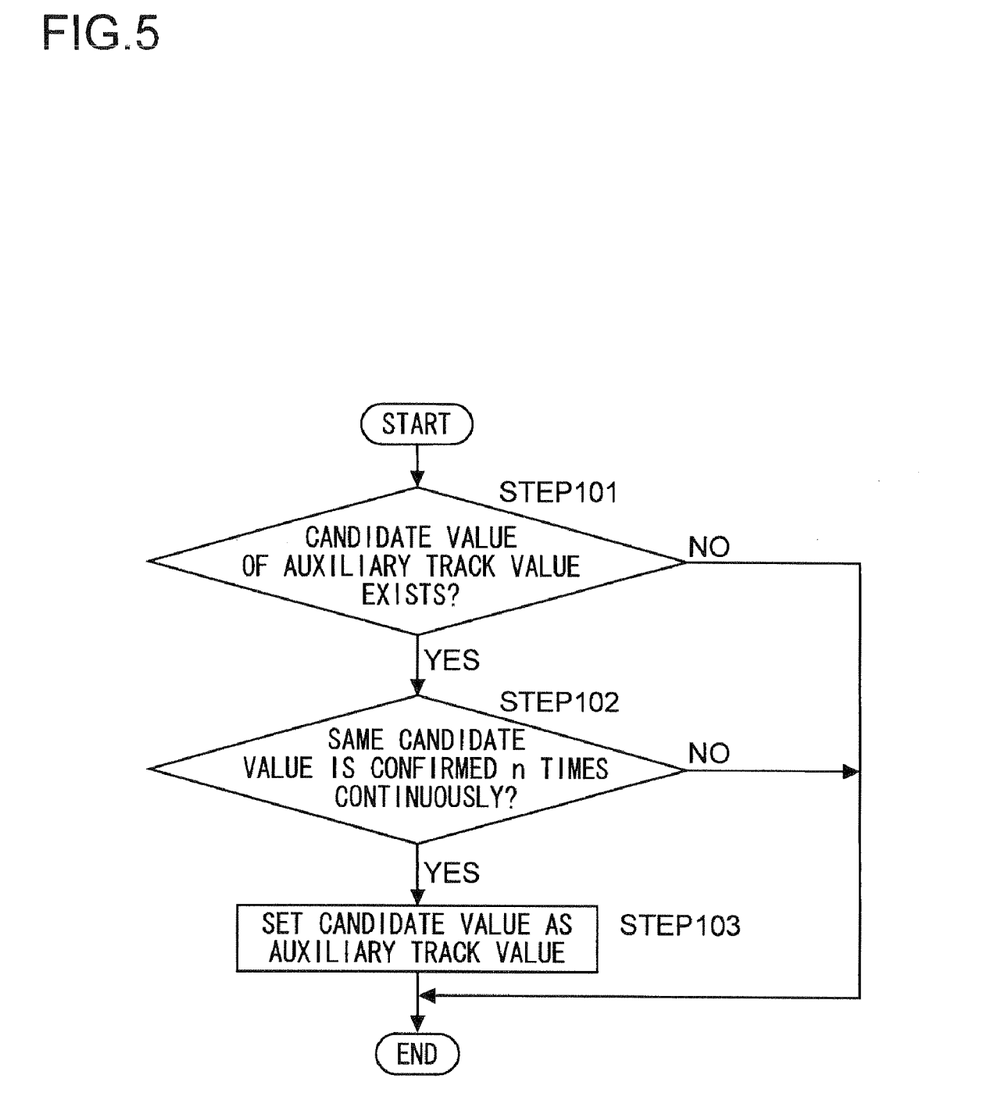
FIG. 5 is a flowchart illustrating an example of a setting method of an auxiliary track value.

An example of a setting method of the auxiliary track value in STEP 10 will be described with reference to the drawings. FIG. 5 is a flowchart illustrating an example of the setting method of the auxiliary track value. As illustrated in FIG. 5, the auxiliary track value setting portion 63 first checks whether or not a candidate value exists based on the histogram as illustrated in FIG. 4B, for example (STEP 101). The candidate value is a signal value having a highest frequency in the histogram or a signal value having a frequency higher than a predetermined threshold value except for the currently set track value (yellow Ye). In the example illustrated in FIG. 4B, the green G corresponds to the candidate value. If there is no candidate value (NO in STEP 101), the process flow ends without setting the auxiliary track value. On the other hand, if there is a candidate value (YES in STEP 101), it is checked whether or not the candidate value is confirmed n times continuously (STEP 102). If it is not confirmed n times continuously (NO in STEP 102), the process flow ends without setting the auxiliary track value. If it is confirmed n times continuously (YES in STEP 102), the candidate value is set as the auxiliary track value (STEP 103). Then, the auxiliary track value information is delivered to the tracking setting portion 64, and the process flow ends. Note that FIG. 5 indicates a process with respect to one input image, and the operation in FIG. 5 is repeated until the auxiliary track value is set in STEP 103. In addition, n is a natural number.

Figure 6A:
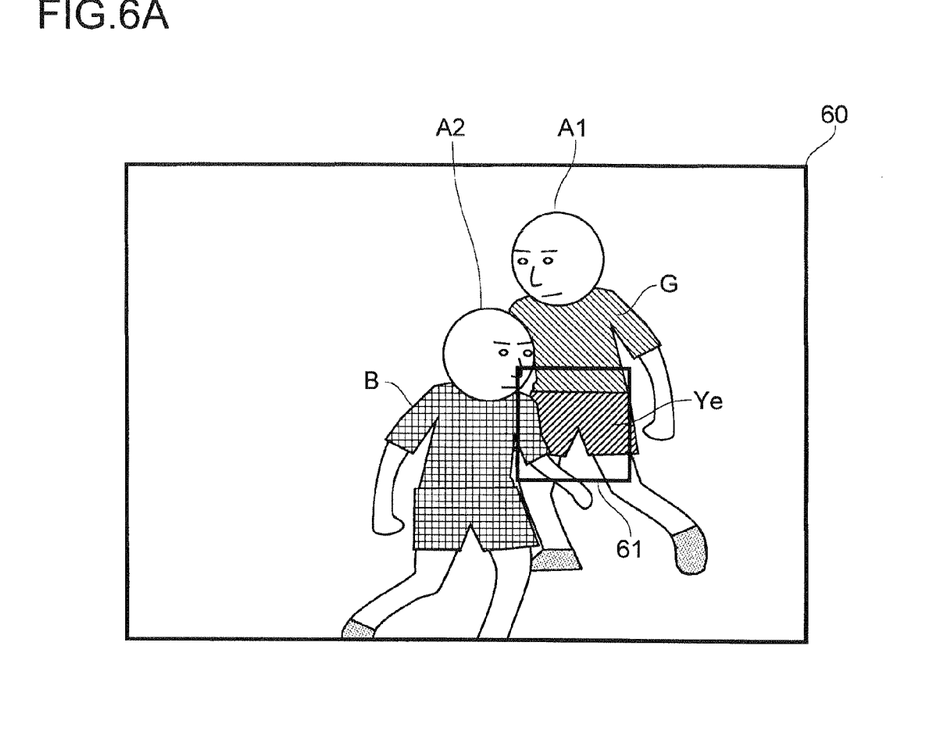
FIG. 6A is a diagram illustrating an example of the input image in the case where the track value is correct.
Figure 6B:
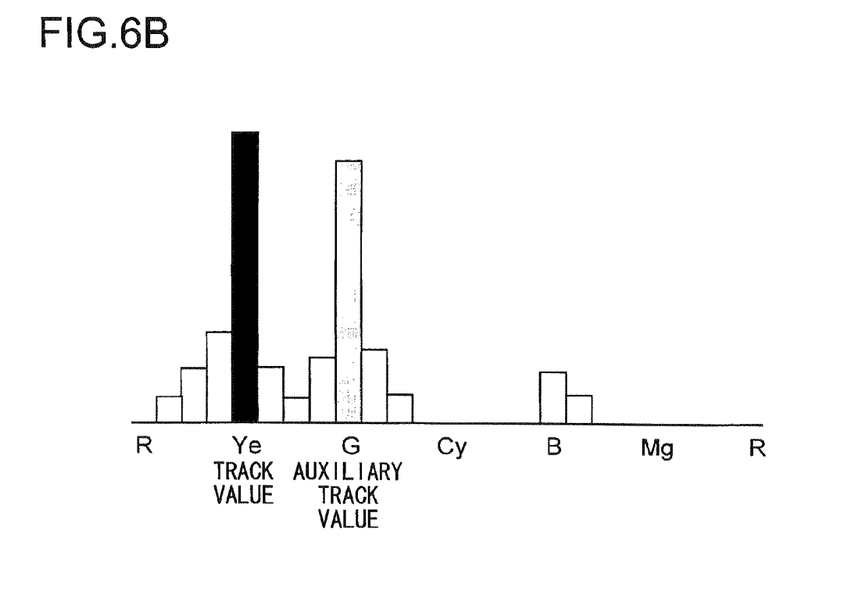
FIG. 6B is a diagram illustrating a result of image analysis of the input image illustrated in FIG. 6A.
Figure 7A:
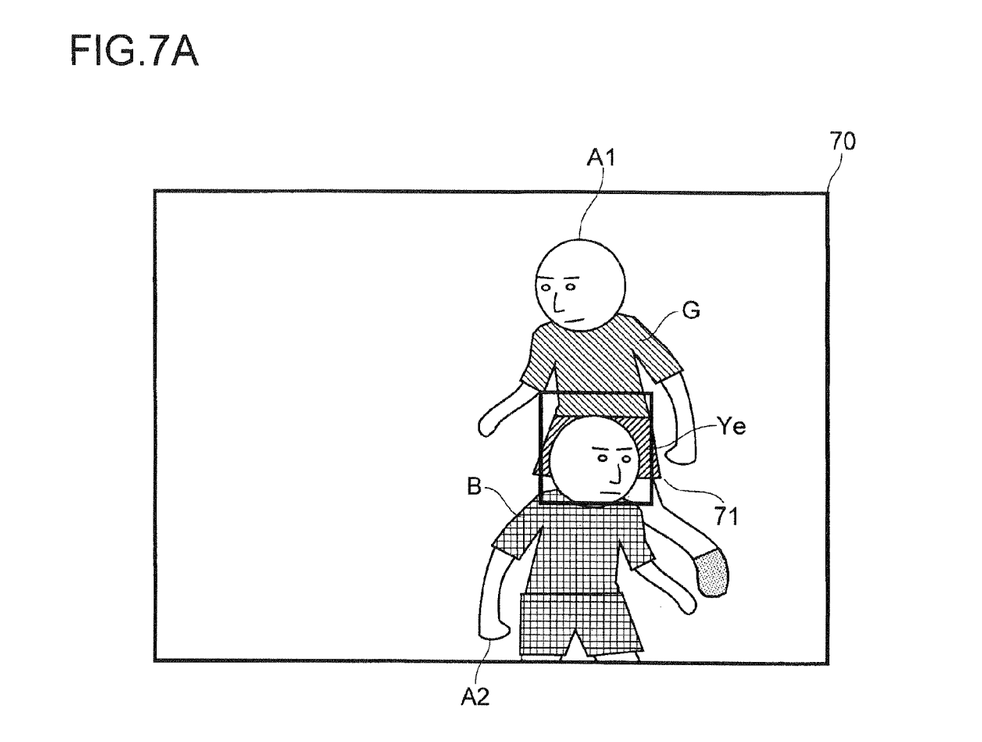
FIG. 7A is a diagram illustrating an example of the input image in the case where the track value is incorrect.
Figure 7B:
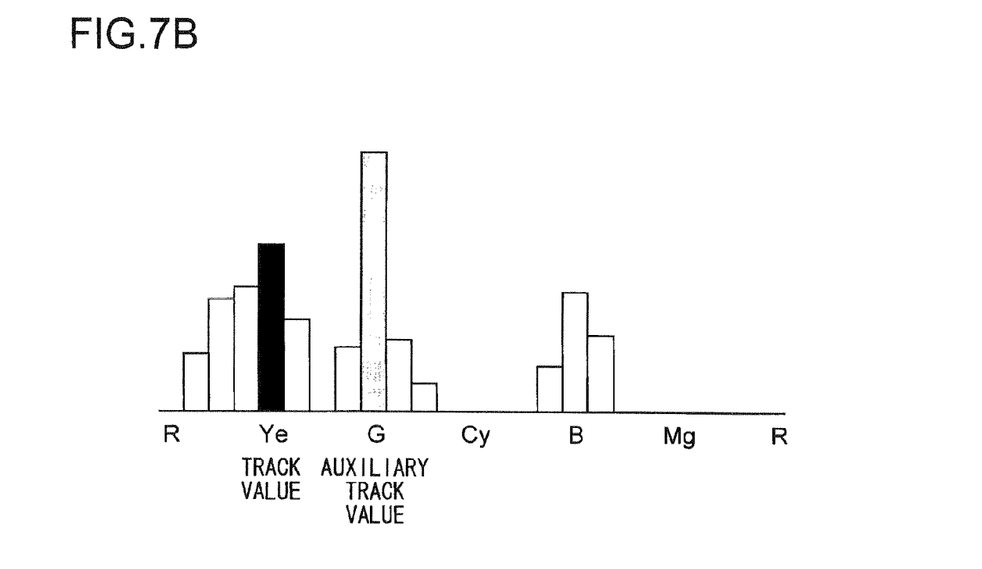
FIG. 7B is a diagram illustrating a result of image analysis of the input image illustrated in FIG. 7A.

On the other hand, if the auxiliary track value is set (YES in STEP 9), the track value setting portion 64 decides whether the currently set track value is correct or not based on the image analysis information (STEP 11). An example of the method of deciding whether the track value is correct or not will be described with reference to the drawings. FIG. 6A is a diagram illustrating an example of the input image in the case where the track value is correct, and FIG. 6B is a diagram illustrating a result of image analysis of the input image illustrated in FIG. 6A. FIG. 7A is a diagram illustrating an example of the input image in the case where the track value is incorrect, and FIG. 7B is a diagram illustrating a result of image analysis of the input image illustrated in FIG. 7A. Note that FIGS. 6A, 6B, 7A and 7B are the same as those of FIGS. 4A and 4B illustrating an example of the input image and a result of image analysis of the input image. In other words, the persons A1 and A2 are included in the input images 60 and 70, the person A1 is the track object, and the set track value is the yellow Ye. Note that it is supposed that the green G is set as the auxiliary track value in FIGS. 6A, 6B, 7A and 7B.

In the input image 60 illustrated in FIG. 6A, the person A2 enters in the search area 61 so as to block a part of the pants of the yellow Ye that is the track value. However, in the histogram illustrated in FIG. 6B, the frequency of the yellow Ye that is the track value is still highest, and the frequency of the yellow Ye is higher than the frequency of the green G of the auxiliary track value. In this case, it is decided that the currently set track value is correct (YES in STEP 11), so that detection of the track target is performed without switching the track value (STEP 13).

In contrast, in the input image 70 illustrated in FIG. 7A, the person A2 enters in a search area 71 so as to block a major part of the pants of the yellow Ye that is the track value. Therefore, in the histogram illustrated in FIG. 7B, the frequency of the yellow Ye that is the track value is no longer highest. On the other hand, the frequency of the green G that is the auxiliary track value maintains a certain size to be detected easily. In this case, the currently set track value is decided to be incorrect (NO in STEP 11), and the auxiliary track value is switched to the track value (STEP 12). In other words, the track value is switched to the green G and is set. Then, the newly set track value is used so as to detect the track target (STEP 13).

In STEP 13, the track target detection portion 65 detects the track target by deciding whether or not a signal value of each pixel is the track value, so that track target information is output. For instance, various known algorithm such as ISO-DATA (Interactive Self Organization of Data) method may be used for classifying into a group in which the signal value becomes the track value and a group in which it does not become the track value, so as to detect the track target. In this case, for example, a plurality of center values may be given so that the signal values are temporarily classified based on which center value is close. Then, incorrect group (in which belonging signal values are little or the variance is large) may be eliminated (combined or split) while a new center value is set from signal values of groups after the temporary classification, and further the temporary classification is repeated for performing classification. Note that it is also possible to classify signal values of pixels by setting the track value and similarity indicating the range that can be regarded as the track value. In addition, it is possible to set the barycenter position of pixels in the group in which the signal value is regarded as the track value as the position of the track target. It is also possible to set the region in which pixels of the group in which the signal value is regarded as the track value extend as a size of the track target. In addition, it is possible to include these pieces of information in the track target information.

After the track target is detected in STEP 13, it is checked whether or not the tracking process is finished (STEP 14). If an instruction to finish the tracking process is input from a user or the like (YES in STEP 14), the tracking process is finished. On the other hand, if the instruction to finish the tracking process is not input (NO in STEP 14), the process flow goes back to STEP 6 in which the input image of the next frame is obtained, and the above-mentioned process (STEP 7 to STEP 13) is performed on the input image. In this way, the tracking process is performed on the input images that are obtained sequentially.

Figure 8A:
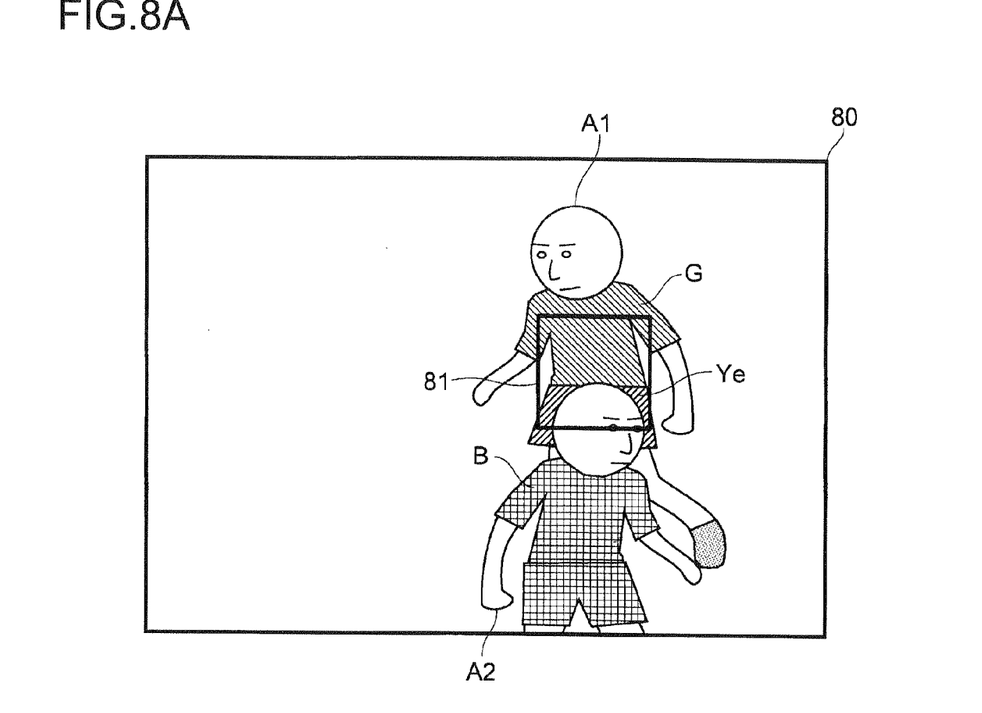
FIG. 8A is a diagram illustrating an example of the input image of the next frame of the input image illustrated in FIG. 7A.
Figure 8B:
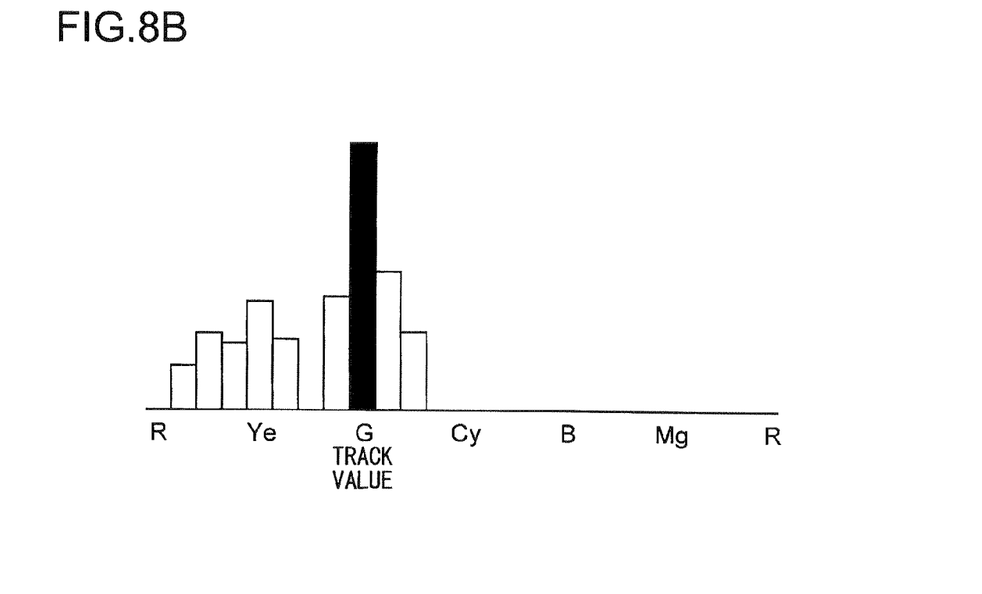
FIG. 8B is a diagram illustrating a result of image analysis obtained from the input image illustrated in FIG. 8A.

Here, an example of the tracking process on the input image of the next frame will be described with reference to FIGS. 8A and 8B. FIG. 8A is a diagram illustrating an example of the input image of the next frame of the input image illustrated in FIG. 7A. FIG. 8B is a diagram illustrating a result of image analysis of the image obtained from the input image illustrated in FIG. 7A. Note that the above-mentioned case where the detection of the track target is performed by supposing that the track value is the green G with respect to the image in the search area 71 of the input image 70 illustrated in FIG. 7A will be described.

In the case illustrated in FIGS. 7A and 7B, if the detection of the track target is performed by supposing that the track value is the green pixels of upper portion in the search area 71 are mainly detected as pixels indicating the track target. If the search area is set round the detected track target in the same manner as the above-mentioned method, a search area 81 that is set with respect to an input image 80 illustrated in FIG. 8A is positioned at the upper position than the search area 71 illustrated in FIG. 7A. In other words, the set search area 81 becomes close to the portion of the shirt in which pixels indicating the green G that is the track value are concentrated.

When the search area 81 as illustrated in FIG. 8A is set, a frequency of the green G that is the newly set track value increases as the histogram illustrated in FIG. 8B. Therefore, it is possible to detect the track target accurately. Note that the auxiliary track value in the following tracking process is also set in the same manner as STEP 10. Then, if the set track value (green G) becomes incorrect (becomes difficult to be detected), the switching operation is performed so that the set auxiliary track value is set as the track value.

As described above, the tracking process portion 60 of this example sets the auxiliary track value adding to the track value that is set for detecting the track target, so that the auxiliary track value can be switched to be the track value. Thus, if the track target is blocked by a certain object and it becomes difficult to detect pixels of the set track value, the auxiliary track value is switched to be the track value so as to detect another track target (i.e., another characteristic part of the same track object). Therefore, it is possible to perform accurate detection successively.

In addition, the track value and the auxiliary track value are not used simultaneously for the tracking process, but they are switched if necessary. Therefore, it is possible to suppress an increase of computing amount necessary for detecting the track target. Therefore, it is possible to realize a high speed operation and low power consumption.

Note that the parameter n when setting the auxiliary track value illustrated in FIG. 5 may be any numeric value, but it is preferable to set appropriately from the following viewpoint. If the value of n is large, the signal value included in the search area successively and continuously for long period becomes the auxiliary track value. Therefore, it is possible to increase probability that the auxiliary track value indicates the characteristic part of the track object. In addition, it is possible to set a signal value that is resistant to variation of an imaging situation so as to detect accurately as the auxiliary track value. On the other hand, if the value of n is small, it is possible to set the auxiliary track value rapidly. Therefore, it is possible to suppress occurrence of a situation that the auxiliary track value has not been set when switching of the track value becomes necessary. Note that it is possible to adopt a structure in which n can be changed in accordance with the situation.

In addition, concerning the decision whether or not the track value is correct in STEP 11 of FIG. 3, it is possible to decide that the track value is incorrect so as to switch the track value of STEP 11, if the frequency of the track value becomes not maximum or becomes smaller than the predetermined value, and the frequency of the auxiliary track value becomes maximum or becomes larger than the predetermined value. In addition, it is possible to decide that the track value is incorrect if the frequency of the auxiliary track value is larger than the frequency of the track value. In addition, it is possible to decide correct or incorrect by considering whether or not the track value or the auxiliary track value is outstandingly larger than the frequency of the signal values in the periphery (i.e., whether it is easily detected or not). The decision of the incorrect may be performed in any manner. But in general, it is decided that the track value is incorrect when the track value becomes not a dominant value in the search area and the auxiliary track value becomes a dominant value.

In addition, it is possible to set a plurality of auxiliary track values. For instance, if there are a plurality of candidate values, it is possible to set all or some of the plurality of candidate values as the auxiliary track value. In addition, it is possible to assign the order of priority to the plurality of set auxiliary track values. It is also possible to select the auxiliary track value that is most appropriate for the track value to be the track value on the stage in which the track value is switched.

FIRST VARIATION EXAMPLE

Figure 9A:
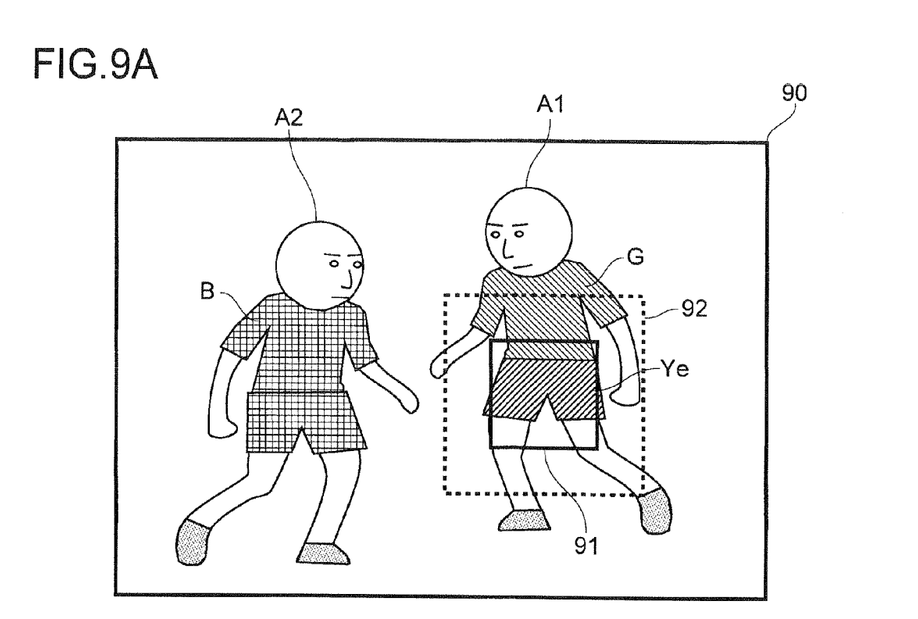
FIG. 9A is a diagram illustrating an example of the input image for illustrating a first variation example.
Figure 9B:
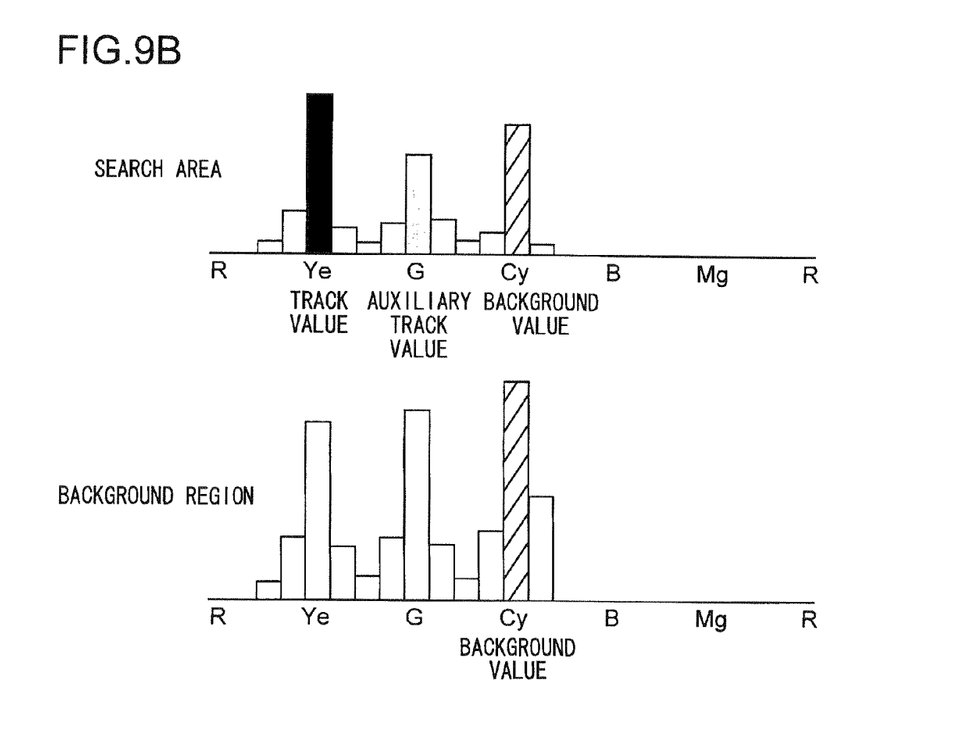
FIG. 9B is a diagram illustrating a result of image analysis of the input image illustrated in FIG. 9A.

In the example described above, the case where only the track value and the auxiliary track value are set is described, but it is possible to adopt a structure in which another value is further set. An example of this case will be described with reference to FIGS. 9A and 9B. FIG. 9A is a diagram illustrating an example of the input image for describing a first variation example, and FIG. 9B is a diagram illustrating a result of image analysis of the input image illustrated in FIG. 9A. FIGS. 9A and 9B are similar to FIGS. 4A and 4B illustrating an example of the input image and a result of image analysis thereof. In other words, an input image 90 includes the persons A1 and A2, the person A1 is the track object, the track value is the yellow Ye, and the auxiliary track value is the green G. In addition, it is supposed that the background in this example is a uniform hue value that is a cyan Cy.

In the case of this example, as illustrated in FIG. 9B, for example, the image analysis portion 62 generates not only the histogram of a search area 91 but also the histogram of a background region 92. In addition, the auxiliary track value setting portion 63 sets the auxiliary track value based on the histograms. Note that, as illustrated in FIG. 9A, the background region 92 may be a region which includes the search area 91 and its peripheral region and has substantially the same center as the background region 92.

In the histogram of the search area 91 illustrated in FIG. 9B, a signal value having a largest frequency is the yellow Ye, a signal value having a next largest frequency is the cyan Cy, and a signal value having a further next largest frequency is the green G. Here, the cyan Cy that has a second largest signal value is the candidate value. If it is confirmed n times successively, the cyan Cy that is a signal value of the background is set as the auxiliary tracking color (STEP 101 to STEP 103 in FIG. 5). Then, if the cyan Cy that is a signal value of the background is switched to the track value and is set (STEP 12 in FIG. 3), the track target detection portion 65 detects the background, and it becomes difficult to detect the track object A1.

Therefore, in this example, when the auxiliary track value is set, the histogram of the background region 92 is referred to, so that the signal value of the background (hereinafter referred to as a background value) is determined while the background value is excluded from the candidate value. In the case illustrated in FIG. 9B, the cyan Cy that is a signal value having a largest frequency in the histogram illustrated in the background region 92 is set as the background value and is excluded from the candidate value.

With the structure of this example, it is possible to prevent the background value from being set as the auxiliary track value. Therefore, incorrect detection of the background by the track target detection portion 65 is suppressed, so that accuracy of the tracking process can be improved.

Note that it is possible to adopt the method of this example when setting the track value in STEP 5 of FIG. 3. In particular, when the signal value having a largest frequency in the search area 91 is set as the track value, incorrect setting of the background value as the track value can be suppressed. Therefore, if the method of this example is adopted in this case for setting the track value, it is appropriate.

In addition, although the background region 92 has the rectangular shape similarly to the search area 91, it is possible that the background region 92 has a shape different from that of the search area 91. In addition, the setting method of the background region 92 with respect to the input image 90 is not limited to the case of the example illustrated in FIG. 9A, and it may be set in any way. For instance, the background region may be set by another method, like a whole region of the input image 90, a whole region except the search area 91 of the input image 90, a whole region except a predetermined middle region of the input image 90, or the like.

SECOND VARIATION EXAMPLE

Figure 10A:
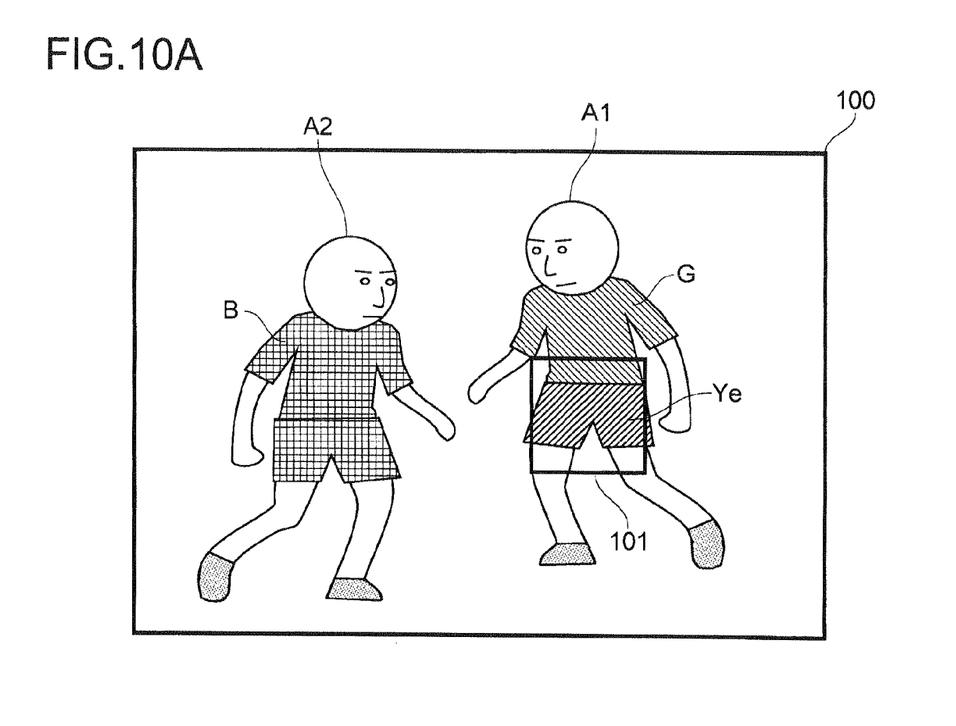
FIG. 10A is a diagram illustrating an example of the input image for illustrating a second variation example.
Figure 10B:
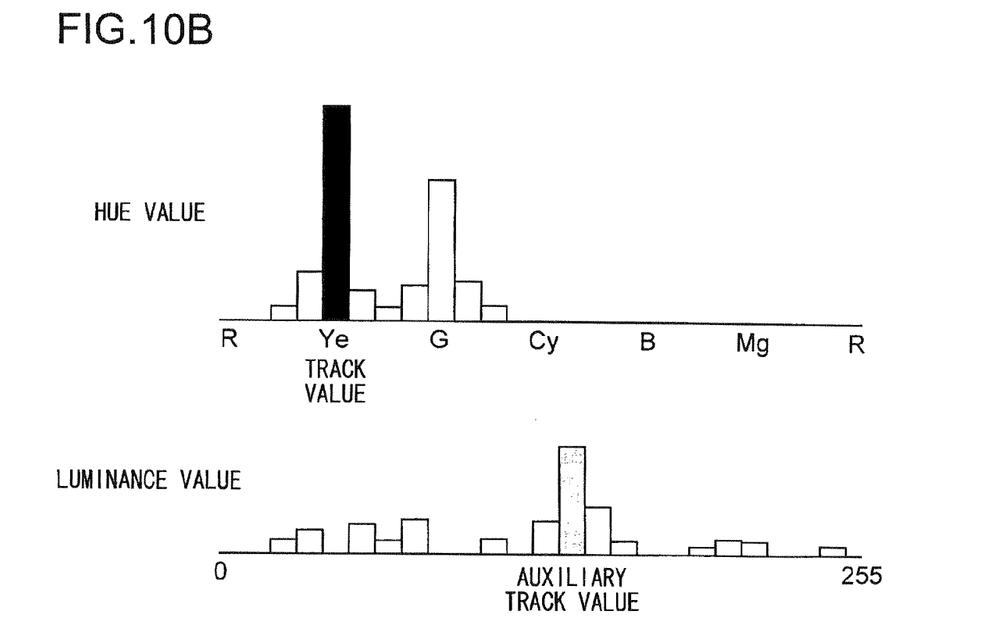
FIG. 10B is a diagram illustrating a result of image analysis of the input image illustrated in FIG. 10A.

In the above-mentioned example, the case where both the track value and the auxiliary track value are hue value is described, but it is possible that they have different signal values. An example of this case will be described with reference to FIGS. 10A and 10B. FIG. 10A is a diagram illustrating an example of the input image for describing a second variation example, and FIG. 10B is a diagram illustrating a result of image analysis of the input image illustrated in FIG. 10A. FIGS. 10A and 10B are similar to FIGS. 4A and 4B illustrating an example of the input image and a result of image analysis thereof. In other words, an input image 100 includes the persons A1 and A2, the person A1 is the track object, and the track value is yellow Ye.

In the case of this example, the image analysis portion 62 generates a plurality of histograms having different types of signal values. For instance, as illustrated in FIG. 10B, a histogram of the hue value and a histogram of the luminance value are generated. Further, in this case, if the type of the signal value of the track value is the hue value, the signal value type of the auxiliary track value is the luminance value.

In this example, the track value and the auxiliary track value can be set independently based on each histogram. For instance, it is possible to set the signal value having a largest frequency in each histogram as the track value or the auxiliary track value, or to set the signal value having a frequency that is outstanding from peripheral signal values as the track value or the auxiliary track value. In addition, it is possible to use different setting methods for setting the track value and the auxiliary track value in accordance with a property of the histogram to be generated (i.e., a type of the signal value). In addition, when the auxiliary track value is set, it is possible to set the signal value that has been confirmed n times successively as described above as the auxiliary track value.

With the structure of this example, if the detection of the track target using a certain type of signal value is difficult, it is possible to switch to the detection using another type of signal value. For instance, if it is difficult to specify the luminance value of the track target under the exposure environment where the luminance value changes actively, it is possible to switch to the detection using the hue value. Further, for example, if the hue value of the track object is substantially the same as the hue value of the periphery so that the detection of the track target is difficult, it is possible to switch to the detection using the luminance value. Therefore, it is possible to perform the detection accurately in various exposure environments.

OTHER VARIATION EXAMPLES

Note that the signal value type that can be set as the track value and the auxiliary track value is not limited to the hue value. For instance, the luminance value, any one of RGB values, a combination of RGB values, or any other type of signal value may be used.

In addition, it is possible to make the pixel signal value, the track value or the auxiliary track value to be low gradation. If they are made to be low gradation, a slight difference of signal value can be ignored, so that the track target can be detected easily. In addition, it is possible to determine the degree of low gradation in accordance with the signal value type to be used for the detection.

In addition, it is possible to crop the image based on track target information output from the tracking process portion 60. For instance, it is possible that the image sensing portion generates a wide-angle input image and that the image processing portion 6 crops a predetermined region including the track target (track object) from the input image so as to generate a desired composition of image. If the image cropping is performed in this way, it is sufficient for the user to direct the image sensing apparatus 1 toward the track object whose image should be taken in a simplified manner, so that a desired composition of image can be obtained. Therefore, it is possible to reduce necessity of the user to concentrate on taking the image.

In addition, although the case where the image sensing apparatus performs the tracking process (when the image is taken) is described, it is possible that the reproduction apparatus performs the same (when the image is reproduced). For instance, this example can be applied to the case where the track target is detected from the image to be reproduced, and the reproduction is performed by performing the image processing corresponding to a result of the detection on the image to be reproduced. In particular, if the above-mentioned image cropping is performed on the image to be reproduced, this example may be used.

In addition, in the image sensing apparatus according to an embodiment of the present invention 1, a control unit such as a microcomputer may perform the operations of the image processing portion 6, the tracking process portion 60 and the like. Further, the whole of a part of the functions realized by the control unit may be described as a program, which is executed by a program executing unit (e.g., a computer), so that the whole or a part of the functions is realized.

In addition, without limiting to the above-mentioned cases, the image sensing apparatus 1 of FIG. 1 and the tracking process portion 60 of FIG. 2 can be realized by hardware or a combination of hardware and software. In addition, if the image sensing apparatus 1 and the tracking process portion 60 are realized by using software, the block diagram of the portion realized by software indicates the functional block diagram of the portion.

Although the embodiments of the present invention are described above, the present invention is not limited to the embodiments, which can be modified variously within the scope of the present invention without deviation from the spirit thereof.

The present invention can be applied to an image processing apparatus for detecting a track object from an input image, and an electronic apparatus such as an image sensing apparatus or a reproduction apparatus having the image processing apparatus.

What is claimed is:

1. An image processing apparatus comprising:
a track signal setting portion which sets a track signal which is a signal indicating a track object in an input image;
an auxiliary track signal setting portion which sets an auxiliary track signal which indicates the track object and is a signal different from the track signal; and
a track target detection portion which detects the track object by detecting the track signal from the input image, wherein
the track signal setting portion is capable of performing a switching operation of setting the auxiliary track signal as a new track signal instead of the set track signal.

2. An image processing apparatus according to claim 1, further comprising:
a search area setting portion which sets a search area in the input image; and
an image analysis portion which determines a frequency distribution of a signal in the search area, wherein
the auxiliary track signal setting portion sets the auxiliary track signal based on the frequency distribution,
the track signal setting portion decides whether the track signal is correct or not based on the frequency distribution and performs the switching operation if it is decided that the set track signal is incorrect, and
the track target detection portion detects the track signal from the image in the search area.

3. An image processing apparatus according to claim 2, wherein the auxiliary track signal setting portion sets a signal having a higher frequency in the frequency distribution with higher priority as the auxiliary track signal.

4. An image processing apparatus according to claim 2, wherein the input image is supplied to the image processing apparatus sequentially, so that the image analysis portion outputs the frequency distribution sequentially, and the auxiliary track signal setting portion sets a signal having a frequency above a predetermined threshold value a predetermined times successively with respect to the frequency distribution output sequentially as the auxiliary track signal.

5. An image processing apparatus according to claim 2, wherein the auxiliary track signal setting portion sets the auxiliary track signal by excluding a signal indicating a background of the input image.

6. An image sensing apparatus comprising:
an image sensing portion which generates an input image by image sensing; and
an image processing apparatus according to claim 1, wherein
the image sensing apparatus performs control based on a result of the detection of the track object by the image processing apparatus.

7. An image processing apparatus comprising:
a first track signal detecting portion which detects from sequentially input shot images a first track signal that is a signal indicating a certain object;
a second track signal detecting portion which detects a second track signal that is a signal indicating the certain object but that is different from the first track signal; and
a track signal setting portion which sets either of the first and second track signals as a track signal based on results of detection by the first and second track signal detecting portions,
wherein the image processing apparatus detects the certain object by detecting the track signal.

8. An image sensing apparatus comprising:
an image sensing portion which generates an input image by image sensing; and
the image processing apparatus according to claim 7,
wherein the image sensing apparatus performs control based on a result of detection of the track object by the image processing apparatus.

* * * * *